(12) United States Patent
Hayashi et al.

(10) Patent No.: US 10,441,036 B2
(45) Date of Patent: Oct. 15, 2019

(54) BUCKLE DEVICE

(71) Applicant: KABUSHIKI KAISHA TOKAI-RIKA-DENKI-SEISAKUSHO, Aichi-ken (JP)

(72) Inventors: Koji Hayashi, Aichi-ken (JP); Tomotaka Suzuki, Aichi-ken (JP); Tetsushi Urushibata, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 0 days.

(21) Appl. No.: 15/899,793

(22) Filed: Feb. 20, 2018

(65) Prior Publication Data

US 2018/0242695 A1    Aug. 30, 2018

(30) Foreign Application Priority Data

Feb. 27, 2017   (JP) ................... 2017-035189

(51) Int. Cl.
  *A44B 11/25*    (2006.01)
  *B60R 22/00*    (2006.01)

(52) U.S. Cl.
  CPC ...... *A44B 11/2507* (2013.01); *A44B 11/2515* (2013.01); *A44B 11/2561* (2013.01); *B60R 22/00* (2013.01)

(58) Field of Classification Search
  CPC ................ A44B 11/2507; B60R 2022/4816
  See application file for complete search history.

(56) References Cited

U.S. PATENT DOCUMENTS

| | | | |
|---|---|---|---|
| 6,853,298 B1* | 2/2005 | Stojanowski | B60R 22/48 180/268 |
| 2009/0049665 A1* | 2/2009 | Maziere | A44B 11/2503 24/633 |

FOREIGN PATENT DOCUMENTS

| | | |
|---|---|---|
| JP | 2011-115560 A | 6/2011 |
| JP | 2011167445 A | 9/2011 |

* cited by examiner

*Primary Examiner* — Robert Sandy
*Assistant Examiner* — Michael S Lee
(74) *Attorney, Agent, or Firm* — Roberts Mlotkowski Safran Cole & Calderon, P.C.

(57) ABSTRACT

At a present buckle device, lateral slits are formed in lateral portions of a slider of a buckle switch. A tab is formed at a portion, which is further toward a device upper side than the lateral slit, of a lateral portion that is at a device left side. A portion, which is further toward a device lower side than the lateral slit, at the lateral portion is an elastic portion, and a magnet is held thereat. Therefore, even if the tab receives pushing force from an ejector and is deformed, deformation arising at the elastic portion can be suppressed, and holding of the magnet can be stabilized.

8 Claims, 7 Drawing Sheets

BUCKLE DEVICE

CROSS-REFERENCE TO RELATED APPLICATION

This application claims priority under 35 USC 119 from Japanese Patent Application No. 2017-035189 filed Feb. 27, 2017, the disclosure of which is incorporated by reference herein.

BACKGROUND

Field of the Invention

The present disclosure relates to a buckle device with which a tongue of a seatbelt device is engaged.

Related Art

There are buckle devices that detect, by a Hall IC switch, that a tongue that has been inserted into a buckle device is engaged with a latch of the buckle device (see, for example, Japanese Patent Application Laid-Open (JP-A) No. 2011-115560). In this type of buckle device, a magnet is provided at a slider that is mounted to an ejector. Due thereto, when the ejector is pushed by the tongue that has been inserted within the buckle device, and the ejector is thereby moved, the magnet that is provided at the slider is moved. When movement of the magnet to a position corresponding to the engaged position of the tongue and the latch is detected by the Hall IC of the Hall IC switch, a warning lamp is turned off for example.

By the way, in the case of a structure in which the slider is not fixed to the ejector, and the slider is moved due to a portion of the slider being pushed by the ejector that has been pushed by the tongue and moved, there may be a case in which deformation arises at the slider due to the portion of the slider being pushed by the ejector. A buckle device is desired that, even if such deformation of the slider arises, can stabilize the holding of a moving body such as a magnet or the like at the slider.

SUMMARY

In view of the above-described circumstances, a buckle device that can stabilize the holding of a moving body by a holding unit is provided.

A buckle device of a first aspect has: a buckle main body configured such that a tongue provided at a webbing of a seatbelt device is inserted into an inner side of the buckle main body and is held at a predetermined position at the inner side of the buckle main body; a moving body detecting unit that has a moving body that can move due to movement of the tongue inserted into the buckle main body, the moving body detecting unit detecting whether or not the tongue is inserted to the predetermined position in the buckle main body on the basis of a result of detection of the moving body; and a holding unit that has a holding portion at which the moving body is held, and a pressure receiving portion that is pushed directly or indirectly by the tongue inserted into the buckle main body, and that moves together with the moving body due to the pressure receiving portion being pushed, the pressure receiving portion and the holding portion being separated such that deformation of the holding portion due to pushing force applied directly or indirectly to the pressure receiving portion from the tongue is suppressed.

In the buckle device of the first aspect, the pressure receiving portion of the holding unit is separated from the holding portion at which the moving body of the moving body detecting unit is held at the holding unit, so, deformation of the holding portion due the pushing force that is applied to the pressure receiving portion directly or indirectly from the tongue at the time when the pressure receiving portion is pushed directly or indirectly by the tongue is suppressed. Due thereto, holding of the moving body by the holding portion can be stabilized.

In a buckle device of a second aspect, in the buckle device of the first aspect, a limiting portion is provided at the holding portion to face the moving body, the limiting portion limiting movement of the moving body toward an outer side of the holding portion.

In the buckle device of the second aspect, the limiting portion that is provided at the holding portion of the holding unit faces the moving body, and, due thereto, movement of the moving body toward the outer side of the holding portion is limited. Here, the holding portion is separated from the pressure receiving portion, and deformation of the holding portion due to deformation of the pressure receiving portion is suppressed. Therefore, displacement of the limiting portion, in the direction in which the limiting portion and the moving body facing one another is cancelled by deformation of the pressure receiving portion, can be suppressed. Due thereto, limiting of the movement of the moving body by the limiting portion can be stabilized.

In a buckle device of a third aspect, in the buckle device of the first aspect or the second aspect, a slit is provided between a pressure receiving portion disposed location (a location at which a pressure receiving portion is disposed) and a holding portion disposed location (a location at which a holding portion is disposed) at the holding unit.

In the buckle device of the third aspect, the slit is provided at the holding unit between the pressure receiving disposed portion location and the holding portion disposed location. Due thereto, if deformation arises at the pressure receiving portion of the holding unit, deformation of the holding portion that follows the deformation of the pressure receiving portion can be suppressed. Due thereto, holding of the moving body by the holding portion can be stabilized.

In a buckle device of a fourth aspect, in the buckle device of the third aspect, the moving body detecting unit is provided with a housing at whose inner side the holding unit is disposed, and that has a portion facing the pressure receiving portion disposed location and the holding portion disposed location at the holding unit in a state in which the holding unit is disposed at the inner side of the housing.

In the buckle device of the fourth aspect, the slit is provided at the holding unit between the pressure receiving portion disposed location and the holding portion disposed location. Therefore, the holding portion disposed location is apart from the pressure receiving portion disposed location. Thus, even if the holding portion disposed location is deformed toward the side of the portion of the housing, to which portion the pressure receiving portion disposed location and the holding portion disposed location at the holding unit face, with the center of deformation being the portion which is at the opposite side of the slit with respect to the pressure receiving portion disposed location, deformation of the portion of the housing, to which the pressure receiving portion disposed location and the holding portion disposed location of the holding unit face, can be suppressed.

As described above, in the buckle device relating to the present disclosure, holding of a moving body by a holding unit can be stabilized.

BRIEF DESCRIPTION OF THE DRAWINGS

Exemplary embodiments will be described in detail with reference to the following figures, wherein.

DETAILED DESCRIPTION

Respective exemplary embodiments are described next on the basis of the drawings of FIG. 1 through FIG. 7. Note that, in the respective drawings, arrow FR indicates the device front side of a present buckle device 10, arrow LH indicates the device left side of the present buckle device 10, and arrow UP indicates the device upper side of the present buckle device 10. Further, in describing the respective exemplary embodiments, portions, members and the like that are basically the same as those of exemplary embodiments explained before the exemplary embodiment that is being described are denoted by the same reference numerals, and detailed description thereof is omitted.

<Structure of First Exemplary Embodiment>

Figure 2A:
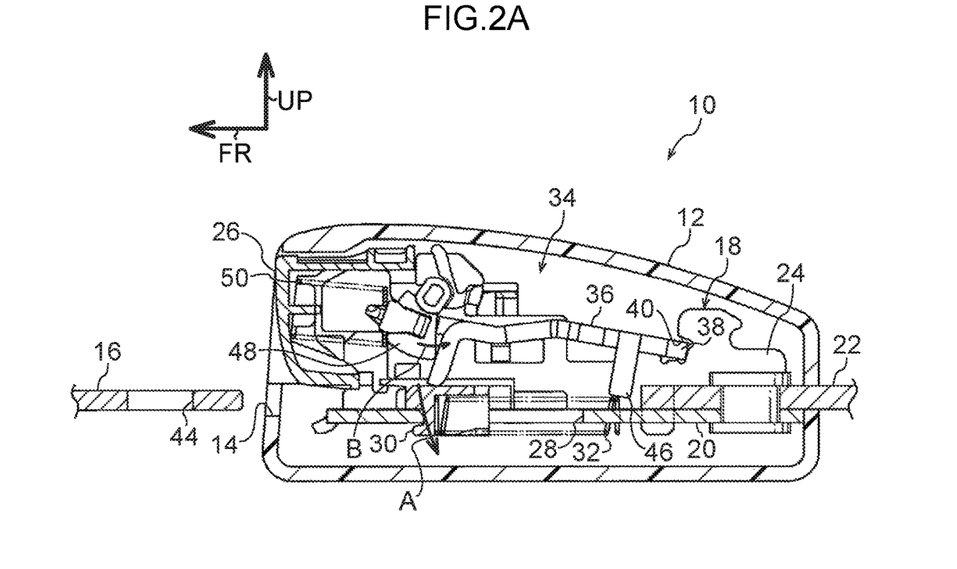
FIG. 2A is a cross-sectional view of the buckle device that is cut along line 2-2 of FIG. 1 and shows a state before a tongue is inserted into the cover.
Figure 2B:
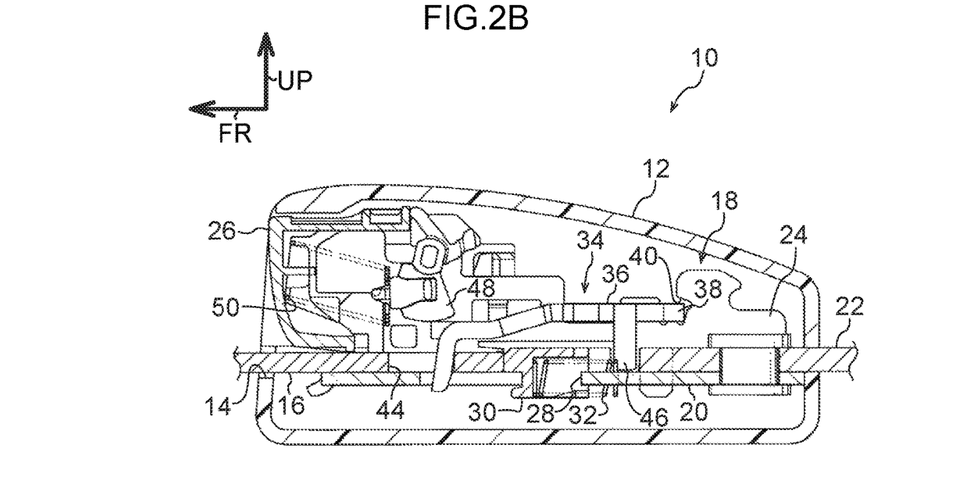
FIG. 2B is a cross-sectional view of the buckle device that is cut along line 2-2 of FIG. 1 and shows a state in which a latch is engaged with the tongue that has been inserted in the cover.

As shown in FIG. 2A and FIG. 2B, the buckle device 10 has a cover 12 that structures a buckle main body. The cover 12 is formed of a synthetic resin material. The device front side end portion of the cover 12 is open. The device lower side portion at the opening portion at the device front side of the cover 12 is a tongue insertion opening 14. As shown in FIG. 2B, a portion of a tongue 16, which is provided at a webbing of a seatbelt device, is passed through the tongue insertion opening 14 from the device front side of the cover 12, and enters into the inner side of the cover 12.

As shown in FIG. 1, FIG. 2A, FIG. 2B and FIG. 3A, a body 18 that, together with the cover 12, structures the buckle main body is provided at the inner side of the cover 12. The body 18 is formed from a metal such as iron or stainless steel or the like for example. Further, the body 18 has a bottom plate 20. The bottom plate 20 is shaped as a flat plate, and thickness direction of the bottom plate 20 is the device vertical (upper and lower) direction. As shown in FIG. 2A and FIG. 2B, a connecting member 22 is disposed at the device upper side of the bottom plate 20.

The connecting member 22 is formed of a metal such as iron or stainless steel or the like for example. The connecting member 22 is shaped as a flat plate, and the thickness direction of the connecting member 22 is the device vertical direction. The device rear side portion of the connecting member 22 is connected to and supported by a vehicle body side portion, such as the floor portion of the vehicle or the frame member of a seat or the like, at the side of the seat or at the vehicle lower side of the seat to which the present buckle device 10 is applied. In contrast, the device front side portion of the connecting member 22 is entered and placed in the inner side of the cover 12 from an opening portion at the device rear side of the cover 12, and is fixed to the device rear side portion of the bottom plate 20.

Further, as shown in FIG. 1, FIG. 2A, FIG. 2B and FIG. 3A, side plates 24 are provided at the device left-right direction both sides of the bottom plate 20. The side plates 24 are formed in plate shapes, and the thickness direction of the side plates 24 is the device left-right direction. The side plates 24 extend toward the device upper side from the end portions at the device left-right direction both sides of the bottom plate 20 of the body 18. Therefore, when the body 18 is viewed from the device front side, the body 18 is a substantial U-shape that opens toward the device upper side. The tongue 16 that has been entered and placed at the inner side of the cover 12 is disposed between the both side plates 24 of the body 18 at the device upper side of the bottom plate 20 of the body 18. Further, a release button 26 is provided at the device front side portion of the body 18. The release button 26 is disposed further toward the device upper side than then tongue 16 that has been inserted into the cover 12, and is supported by the both side plates 24 of the body 18 so as to be able to slide in the device front and rear direction.

On the other hand, as shown in FIG. 2A and FIG. 2B, a hole portion 28 is formed in the bottom plate 20 of the body 18. An ejector 30 is provided in the hole portion 28. The ejector 30 is disposed so as to pass-through the hole portion 28, and is supported at the body 18 so as to be able to slide in the device front and rear direction. The ejector 30 faces, from the device rear side, the device rear side end of the tongue 16 that has been entered and placed at the inner side of the cover 12. The ejector 30 is moved toward the device rear side (see FIG. 2B) by being pushed by the device rear side end of the tongue 16 that is moved toward the device rear side at the interior of the cover 12.

As shown in FIG. 2A and FIG. 2B, an ejector urging spring 32 that serves as an ejector urging portion is provided at the inner side of the hole portion 28 of the body 18. The ejector urging spring 32 is a compression coil spring. One side end portion of the ejector urging spring 32 is engaged with the device rear side end portion of the hole portion 28 of the body 18. On the other hand, the another side end portion of the ejector urging spring 32 is engaged with the ejector 30. The ejector 30 is urged toward the device front side by the ejector urging spring 32.

On the other hand, as shown in FIG. 1, FIG. 2A, FIG. 2B and FIG. 3A, the present buckle device 10 has a latch 34 that serves as a locking member. The latch 34 has a base portion 36. A pair of axial pieces 38 are provided at the device rear side end portion of the base portion 36. One of the axial pieces 38 extends toward the device left side from the device rear side end portion of the base portion 36. Another of the axial pieces 38 extends toward the device right side from the device rear side end portion of the base portion 36. Cut-out portions 40 are formed in the respective side plates 24 of the body 18 in correspondence with these axial pieces 38. The cut-out portions 40 open toward a device front and upper side. The axial piece 38 at the device left side is entered and placed at the inner side of the cut-out portion 40 of the side plate 24 that is at the device left side. The axial piece 38 at the device right side is entered and placed at the inner side of the cut-out portion 40 of the side plate 24 that is at the device right side. Due thereto, the latch 34 is made able to rotate in directions around an axis whose axial direction is the device left-right direction, with the center of rotation being the axial pieces 38.

On the other hand, as shown in FIG. 2A and FIG. 2B, an extending portion 41 is provided at the device front side of the base portion 36 of the latch 34. The extending portion 41 extends from the device front side end of the base portion 36 toward the device front side. Moreover, an engaging portion 42 is provided at the device front side of the base portion 36 of the latch 34. The engaging portion 42 extends generally toward the device lower side from the device front side end of the base portion 36 of the latch 34 (from further toward the device rear side than the device front side end of the extending portion 41). In a tongue non-inserted state (the state shown in FIG. 2A) in which the tongue 16 is not placed at the inner side of the cover 12, the distal end of the engaging portion 42 of the latch 34 abuts the device upper side surface of the ejector 30. Due thereto, rotation of the latch 34 in an engaging direction (the arrow A direction in FIG. 2A), which is one direction around the axial pieces 38, is limited.

When the ejector 30 is moved toward the device rear side, and the distal end of the engaging portion 42 of the latch 34 faces an engaging hole 44 that is formed in the tongue 16, the latch 34 can rotate in the engaging direction. Due to the latch 34 being rotated in the engaging direction in this way, as shown in FIG. 2B, the engaging portion 42 of the latch 34 passes-through and is disposed in the engaging hole 44 that is formed in the tongue 16. Due thereto, movement of the tongue 16 toward the device front side is limited by the engaging portion 42 of the latch 34.

Further, as shown in FIG. 2A and FIG. 2B, the base portion 36 of the latch 34 has abutment portions 46. The abutment portions 46 extend generally toward the device lower side from the device left-right direction both ends at the device front and rear direction intermediate portion of the base portion 36. The abutment portions 46 face the ejector in the device front and rear direction. Due to the abutment portions 46 being pushed by the ejector 30 that is moved toward the device rear side, the latch 34 is rotated in the engaging direction (the arrow A direction in FIG. 2A).

Figure 1:
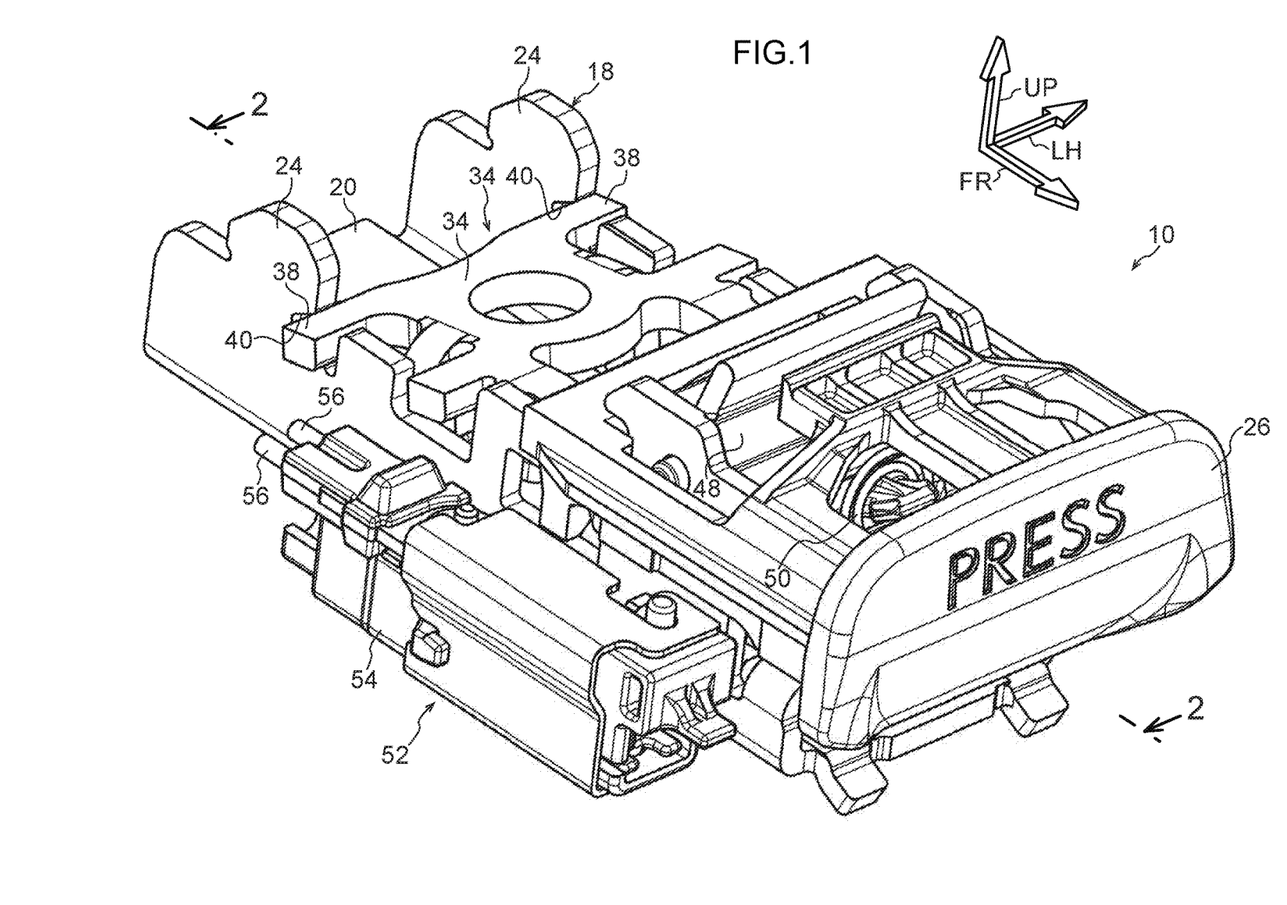
FIG. 1 is a perspective view of the structure of an inner side of a cover of a buckle device relating to a first exemplary embodiment.

On the other hand, as shown in FIG. 1, FIG. 2A, FIG. 2B and FIG. 3A, a lock piece 48 is provided at the device front side of the latch 34. The lock piece 48 is supported by the both side plates 24 of the body 18 so as to be able to rotate around an axis whose axial direction is the device left-right direction. As shown in FIG. 1, FIG. 2A, and FIG. 2B, a lock piece urging spring 50 is provided at the device front side of the lock piece 48. The lock piece urging spring 50 is a compression coil spring. One end portion (the device rear side end portion) of the lock piece urging spring 50 is engaged with the lock piece 48. The lock piece 48 is urged by the urging force of the lock piece urging spring 50 in a locking direction (the arrow B direction in FIG. 2A) that is one direction around an axis whose axial direction is the device left-right direction.

In the state (see FIG. 2A) in which the latch 34 is not rotated in the engaging direction (the arrow A direction in FIG. 2A), the lock piece 48 abuts the device front side end of the extending portion 41 of the latch 34 from the device front side, and due thereto, rotation of the lock piece 48 in the locking direction is limited. In the state in which the latch 34 has been rotated in the engaging direction, and the engaging portion 42 of the latch 34 has passed-through and is disposed in the engaging hole 44 of the tongue 16, the state in which the lock piece 48 and the device front side end of the extending portion 41 of the latch 34 face one another is cancelled, and the limiting of rotation of the lock piece 48 in the locking direction by the extending portion 41 is cancelled, and the lock piece 48 is rotated in the locking direction. Due thereto, the lock piece 48 is disposed at the device upper side of the extending portion 41 of the latch 34, and rotation of the latch 34 in the direction opposite the engaging direction is limited.

Further, another end portion (the device front side end portion) of the lock piece urging spring 50 is engaged with the release button 26, and the release button 26 is urged toward the device front side by the urging force of the lock piece urging spring 50. When the release button 26 is slid toward the device rear side against the urging force of the lock piece urging spring 50, the release button 26 engages with the lock piece 48 at further toward the device upper side than the portion that is the center of rotation of the lock piece 48, and the portion that is further toward the device upper side than the portion that is the center of rotation at the lock piece 48 is pushed toward the device rear side by the release button 26. Due thereto, the lock piece 48 is rotated in the direction opposite the locking direction against the urging force of the lock piece urging spring 50, and the limiting of rotation of the latch 34 in the direction opposite the engaging direction is cancelled. When, in this state, the engaging portion 42 of the latch 34 is pushed toward the device front side by the inner peripheral portion of the engaging hole 44 of the tongue 16, the latch 34 is rotated in the direction opposite the engaging direction, and limiting of movement of the tongue 16 toward the device front side by the latch 34 is cancelled.

Figure 3A:
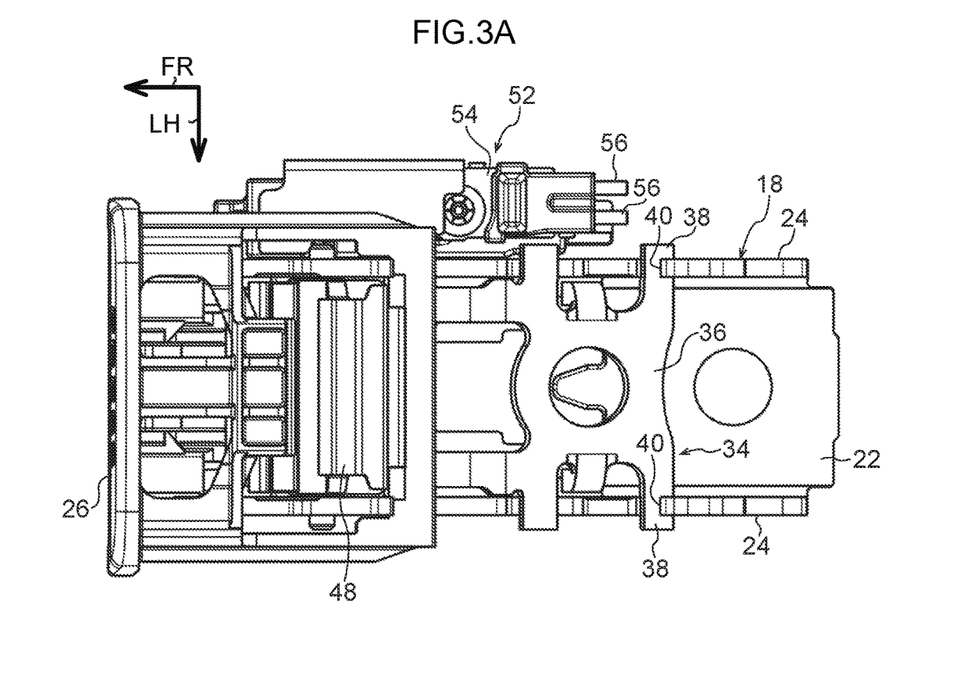
FIG. 3A is a plan view showing the overall structure of the inner side of the cover of the buckle device.
Figure 3B:
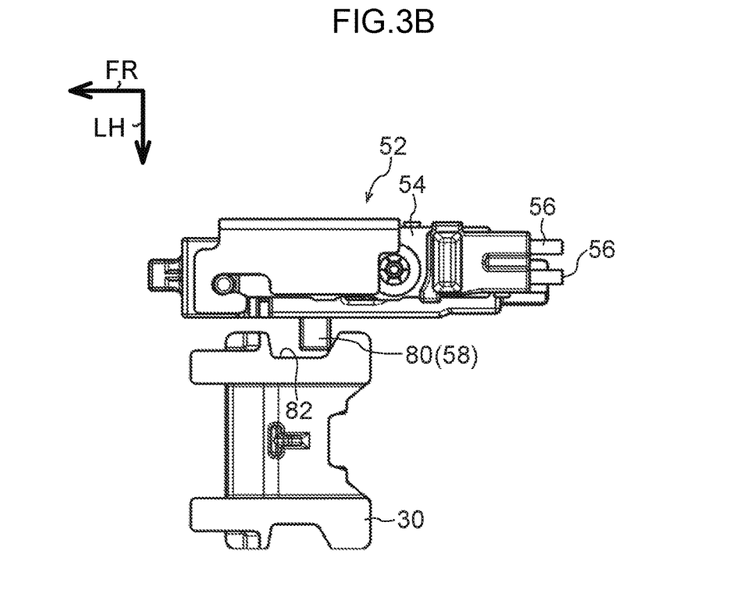
FIG. 3B is a plan view of an ejector and a buckle switch.

On the other hand, a buckle switch 52, which serves as a moving body detecting unit and is shown in FIG. 1, FIG. 3A and FIG. 3B, is provided at the inner side of the cover 12. The buckle switch 52 is disposed at the device right side of the body 18. The buckle switch 52 has a housing 54. The housing 54 is box-shaped, and the device front side end of the housing 54 is open. Further, connection terminals 56 are provided at the housing 54. The connection terminals 56 are formed from a metal that is electrically conductive, and are electrically connected to an ECU (not shown in the drawings) of the vehicle in which the present buckle device 10 is installed.

Further, a magnetic sensor (not shown in the drawings) that serves as a proximity sensor and that structures a proximity switch, is provided at the housing 54. The magnetic sensor is structured to include, for example, a magnetoresistance effect element (a magneto resistive sensor).

Moreover, as shown in the respective drawings from FIG. 4 through FIG. 7, a slider 58 that serves as a holding unit is provided at the inner side of the housing 54. The slider 58 is formed substantially in the shape of a box on the whole, and the device front side end of the slider 58 is open. A lateral slit 62A that serves as a slit is provided in a lateral portion 60A that serves as an opposing portion at the device left side of the slider 58. A lateral slit 62B that serves as a slit is provided in a lateral portion 60B that serves as an opposing portion at the device right side of the slider 58. Further, the respective lateral slits 62A and 62B are long in the device front and rear direction. The device front side end of the lateral slit 62A opens at the device front side end of the lateral portion 60A. The device front side end of the lateral slit 62B opens at the device front side end of the lateral portion 60B.

On the other hand, a pair of lower slits 66A and 66B are provided at a lower portion 64 that is at the device lower side of the slider 58. The lower slit 66A is formed in the device left side at the device front side portion of the lower portion 64, and the lower slit 66B is formed in the device right side at the device front side portion of the lower portion 64. Further, the lower slits 66A and 66B are long in the device front and rear direction, and the device front side ends of the lower slits 66A and 66B open at the device front side end of the lower portion 64.

The device rear side end of the lower slit 66A that is at the device left side is disposed at the device lower side of the device rear side end of the lateral slit 62A that is at the device left side. The device rear side end of the lower slit 66B that is at the device right side is disposed at the device lower side of the device rear side end of the lateral slit 62B that is at the device right side. Moreover, the surface at the device left side of the lower slit 66A that is at the device left side is disposed on an extension of the inner side surface of the slider 58 at the lateral portion 60A that is at the device left side. The surface at the device right side of the lower slit 66B that is at the device right side is disposed on an extension of the inner side surface of the slider 58 at the lateral portion 60B that is at the device right side.

The portions, which are further toward the device lower side than the lateral slits 62A and 62B, of the respective lateral portions 60A and 60B are elastic portions 68A and 68B that structure a holding portion. The elastic portion 68A at the device left side is elastically deformable so as to rotate in directions (the arrow C1 direction in FIG. 7 and the direction opposite thereto) around an axis whose axial direction is the device vertical direction, with the substantial center of rotation being the device rear side end of the elastic portion 68A (which is at the device lower side of the device rear side end of the lateral slit 62A at the device left side). In contrast, the elastic portion 68B at the device right side is elastically deformable so as to rotate in directions (the arrow C2 direction in FIG. 7 and the direction opposite thereto) around an axis whose axial direction is the device vertical direction, with the substantial center of rotation being the device rear side end of the elastic portion 68B (which is at the device lower side of the device rear side end of the lateral slit 62B at the device right side). Further, stopper claws 70A and 70B that serve as limiting portion are provided at the device front side portions of the respective elastic portions 68A and 68B. The stopper claw 70A of the elastic portion 68A at the device left side is disposed at the device right side surface of the elastic portion 68A. The stopper claw 70B of the elastic portion 68B at the device right side is disposed at the device left side surface of the elastic portion 68B.

The device front side surfaces of the respective stopper claws 70A and 70B are inclined surface portions 72A and 72B. The inclined surface portion 72A of the stopper claw 70A that is at the device left side is inclined so as to be displaced toward the device right side while heading toward the device rear side. Therefore, when load is applied to the inclined surface portion 72A from the device front side, the elastic portion 68A at the device left side is elastically deformed (the one dot chain line state in FIG. 7) so as to rotate toward the device left side (in the arrow C1 direction in FIG. 7) with the device rear side end of the elastic portion 68A being the center of rotation. In contrast, the inclined surface portion 72B of the stopper claw 70B that is at the device right side is inclined so as to be displaced toward the device left side while heading toward the device rear side. Therefore, when load is applied to the inclined surface portion 72B from the device front side, the elastic portion 68B at the device right side is elastically deformed (the one dot chain line state in FIG. 7) so as to rotate toward the device right side (in the arrow C2 direction in FIG. 7) with the device rear side end of the elastic portion 68B being the center of rotation.

Figure 4:
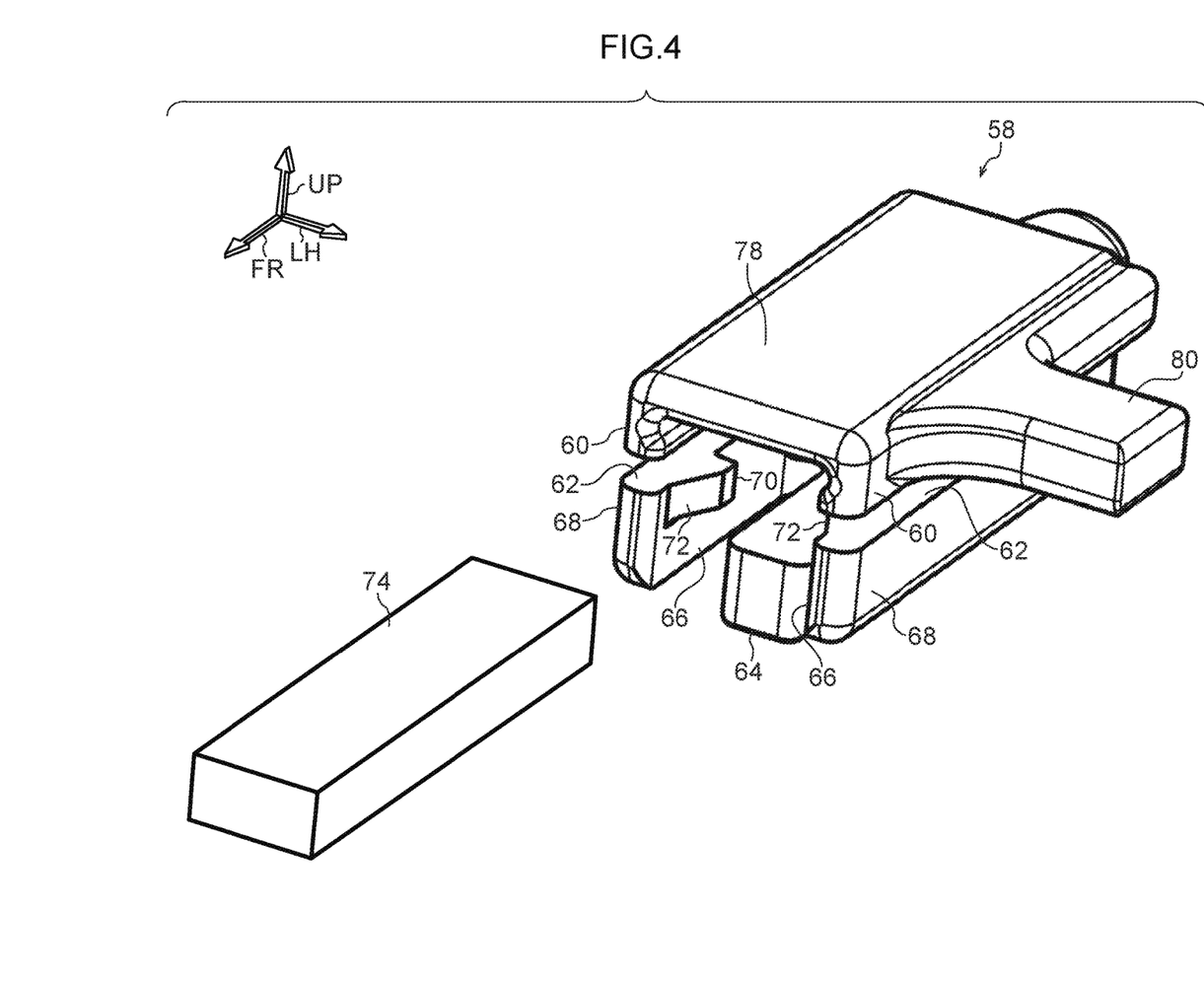
FIG. 4 is a perspective view of a slider and a magnet from an upper left front side of the buckle device.
Figure 5:
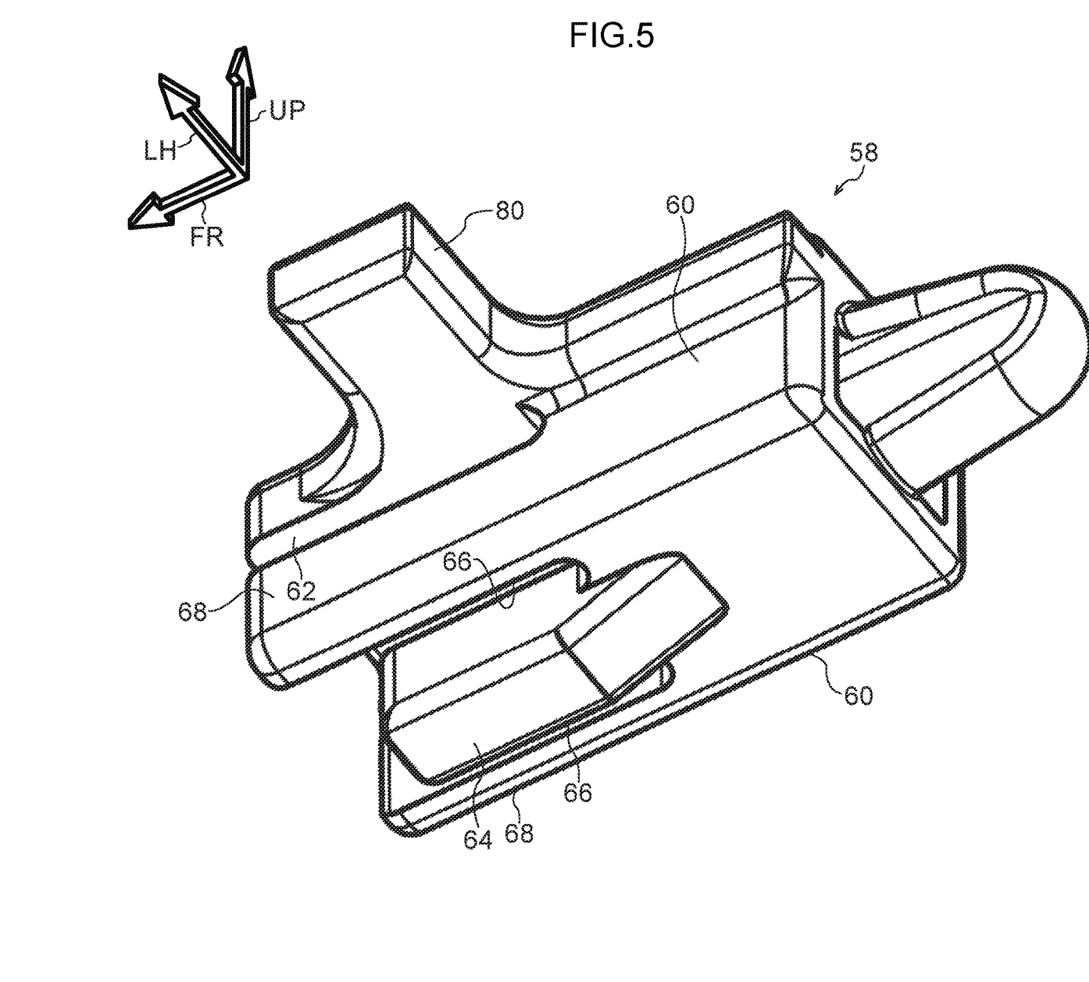
FIG. 5 is a perspective view of the slider from a lower left rear side of the buckle device.
Figure 7:
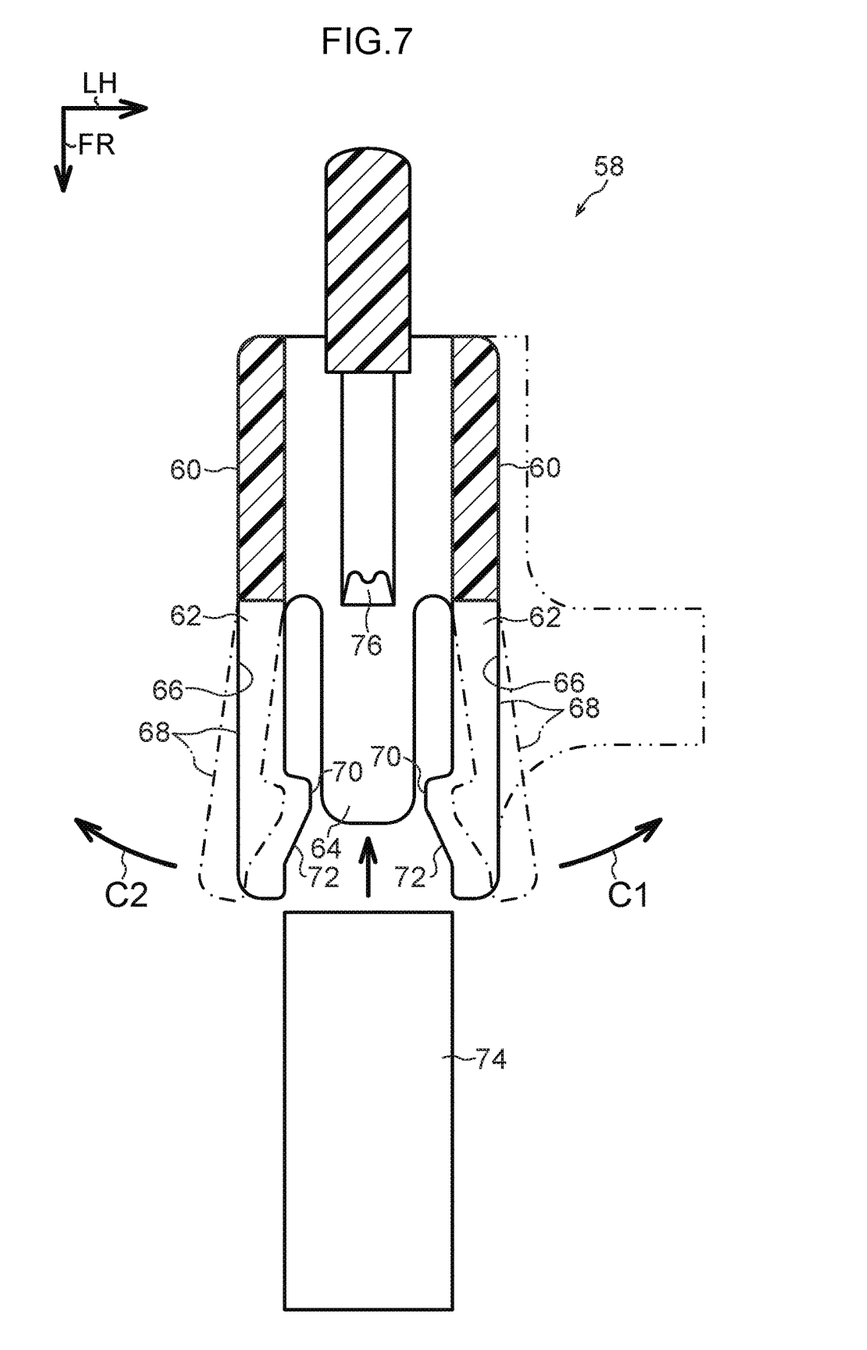
FIG. 7 is a cross-sectional view that is cut along line 7-7 of FIG. 6A.

As shown in FIG. 4 and FIG. 7, a magnet (permanent magnet) 74 serving as a moving body is provided at the inner side of the slider 58. The magnet 74 is rectangular parallelepiped. The magnet 74 is inserted into the inner side of the slider 58 from the device front side of the slider 58, and, due thereto, the magnet 74 is disposed at the inner side of the slider 58. Further, the device left-right direction dimension of the magnet 74 is made to be slightly smaller than the interval (distance) between the both lateral portions 60A and 60B of the slider 58.

Therefore, at the time when the magnet 74 is inserted into the inner side of the slider 58, the inclined surface portions 72A and 72B of the stopper claws 70A and 70B of the both elastic portions 68A and 68B are pushed by the device left-right direction both side end portions of the device rear side end of the magnet 74. Due thereto, the both elastic portions 68A and 68B are elastically deformed until the interval (distance) between the both stopper claws 70A and 70B becomes greater than or equal to the device left-right direction dimension of the magnet 74. Due thereto, the magnet 74 can enter into the inner side of the slider 58. In the state in which the magnet 74 is disposed at the inner side of the slider 58, the both stopper claws 70A and 70B face at the device front side with respect to the device left-right direction both side end portions of the device front side end of the magnet 74, and, due thereto, displacement of the magnet 74 toward the device front side is suppressed.

Figure 6A:
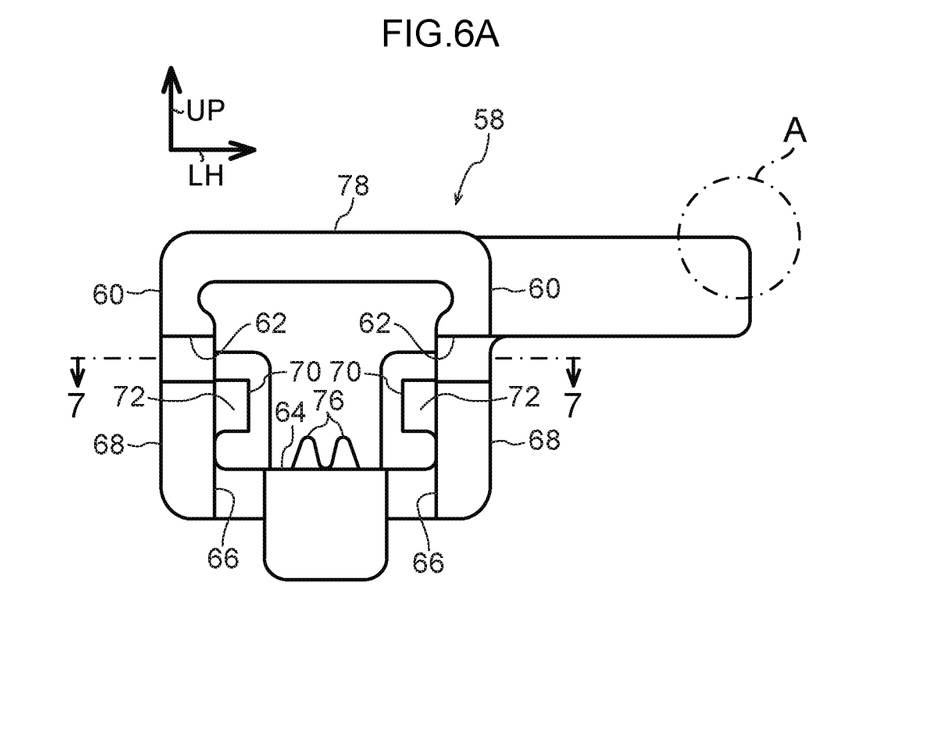
FIG. 6A is a front view of the slider of the buckle device relating to the first exemplary embodiment.

Moreover, as shown in FIG. 6A, collapsible ribs 76 are provided at the lower portion 64 of the slider 58. When the magnet 74 is inserted into the inner side of the slider 58, the collapsible ribs 76 are collapsed toward the device lower side by the magnet 74. The magnet 74 is held by an upper portion 78 that is at the device upper side of the slider 58 and the collapsible ribs 76 that have been collapsed in this way.

On the other hand, a tab 80 serving as a pressure receiving portion is provided at the slider 58. The tab 80 extends toward the device left side from a portion, which is further toward the device upper side portion than the lateral slit 62A, at the lateral portion 60A that is at the device left side of the slider 58. The tab 80 enters into the inner side of the body 18 through a housing slit portion, which is formed in the housing 54 of the buckle switch 52, and a body slit portion, which is formed in the side plate 24 at the device right side of the body 18.

As shown in FIG. 3B, a concave portion 82 is formed in the ejector 30 in correspondence with the distal end portion of the tab 80 that is entered into the inner side of the body 18. The concave portion 82 opens at the device right side surface of the ejector 30. The distal end portion of the tab 80 is disposed at (entered in) the inner side of the concave portion 82. When the distal end portion of the tab 80 is pushed by the device front side surface of the inner side of the concave portion 82 due to the ejector 30 being slid toward the device rear side, the slider 58 is slid toward the device rear side. Further, when the distal end portion of the tab 80 is pushed by the device rear side surface of the inner side of the concave portion 82 due to the ejector 30 being slid toward the device front side, the slider 58 is slid toward the device front side.

The dimension in the device front and rear direction of the concave portion 82 is made to be larger than the device front and rear direction dimension of the tab 80. For example, at the time of the start of sliding of the ejector 30 toward the device rear side, there is an interval (gap) between the device front side surface of the inner side of the concave portion 82 and the distal end portion of the tab 80. Until the device front side surface of the inner side of the concave portion 82 abuts the distal end portion of the tab 80 due to the sliding of the ejector 30 toward the device rear side, the tab 80 (the slider 58) is not slid toward the device rear side. Further, at the start of the sliding of the ejector 30 toward the device front side, there is an interval (gap) between the device rear side surface of the inner side of the concave portion 82 and the distal end portion of the tab 80. Until the device rear side surface of the inner side of the concave portion 82 abuts the distal end portion of the tab 80 due to the sliding of the ejector 30 toward the device front side, the tab 80 (the slider 58) is not slid toward the device front side. Therefore, the range of sliding of the slider 58 in the device front and rear direction is smaller than the range of sliding of the ejector 30 in the device front and rear direction.

<Operation and Effects of First Exemplary Embodiment>

At the present buckle device 10, in the tongue non-inserted state that is shown in FIG. 2A, the tongue 16 is placed into the inner side of the cover 12 from the tongue insertion opening 14 of the cover 12. In this state, when the tongue 16 is moved toward the device rear side, the device rear side end of the tongue 16 abuts the ejector 30. In this state, when the tongue 16 is moved toward the device rear side against the urging force of the ejector urging spring 32, the ejector 30 is pushed by the tongue 16 and is moved toward the device rear side.

Due thereto, the state in which the distal end of the engaging portion 42 of the latch 34 and the device upper side surface of the ejector 30 face one another is cancelled, and the distal end of the engaging portion 42 of the latch 34 faces the engaging hole 44 of the tongue 16. Moreover, in this state, when the abutment portions 46 of the latch 34 are pushed by the ejector 30, the latch 34 is rotated in the engaging direction (the arrow A direction in FIG. 2A). Due thereto, the engaging portion 42 of the latch 34 passes-through and is disposed within the engaging hole 44 of the tongue 16, and the distal end portion of the engaging portion 42 of the latch 34 enters into the hole portion 28 of the body 18.

Further, when the latch 34 is rotated in the engaging direction, the limiting of the rotation of the lock piece 48 by the device front side end of the extending portion 41 of the latch 34 is cancelled. Due thereto, when the lock piece 48 is rotated in the locking direction (the arrow B direction in FIG. 2A) by the urging force of the lock piece urging spring 50, the rotation of the latch 34 in the direction opposite the engaging direction (i.e., the rotation of the latch 34 in the direction opposite arrow A in FIG. 2A) is limited by the lock piece 48 (the state shown in FIG. 2B).

In this state shown in FIG. 2B, movement of the tongue 16 toward the device front side is limited, and the tongue 16 is in a tongue held state in which the tongue 16 is held by the buckle device 10. In this state, if the webbing of the seatbelt device is placed around the body of the vehicle occupant who is seated in the seat to which the present buckle device 10 is applied, there is a state in which the webbing is applied to the body of the vehicle occupant, and the body of the vehicle occupant is restrained by the webbing.

In contrast, in the state in which the webbing is applied to the body of the vehicle occupant, when the release button 80 of the buckle device 10 is pushed and the release button 80 is slid toward the device rear side, the lock piece 48 is pushed by a portion of the release button 80, and, due thereto, the lock piece 48 is rotated in the direction opposite the locking direction (i.e., is rotated in the direction opposite arrow B in FIG. 2A). Due thereto, when the limiting of the rotation of the latch 34 in the direction opposite the engaging direction (in the direction opposite arrow A in FIG. 2A) by the lock piece 48 is cancelled, the tongue 16 is moved toward the device front side by the urging force of the ejector urging spring 32 that the tongue 16 receives via the ejector 30.

Due thereto, when the engaging portion 42 of the latch 34 is pushed by the inner side portion of the engaging hole 44 of the tongue 16, the latch 34 is rotated in the direction opposite the engaging direction. Due thereto, the limiting of movement of the tongue 16 toward the device front side by the engaging portion 42 of the latch 34 is cancelled, and the tongue 16 can be pulled-out from the cover 12, and the vehicle occupant can take the webbing off of his/her body.

On the other hand, as described above, when the ejector 30 is pushed by the tongue 16 and is moved toward the device rear side, the device front side surface of the inner side of the concave portion 82 of the ejector 30 abuts the tab 80 of the slider 58. In this state, when the ejector 30 is moved further toward the device rear side, the tab 80 is pushed toward the device rear side by the device front side surface of the inner side of the concave portion 82, and, due thereto, the slider 58 is slid toward the device rear side, and the magnet 74 provided at the slider 58 is slid toward the device rear side together with the slider 58.

In contrast, when the ejector 30 is moved toward the device front side by the urging force of the ejector urging spring 32, the device rear side surface of the inner side of the concave portion 82 of the ejector 30 abuts the tab 80 of the slider 58. In this state, when the ejector 30 is moved further toward the device front side, the tab 80 is pushed toward the device front side by the device rear side surface of the inner side of the concave portion 82, and, due thereto, the slider 58 is slid toward the device front side, and the magnet 74 provided at the slider 58 is slid toward the device front side together with the slider 58.

In this way, the magnet 74 that is provided at the slider 58 is slid in the device front and rear direction by the movement of the ejector 30 in the device front and rear direction. Due to the sliding of the magnet 74 in the device front and rear direction, the relative positional relationship between the magnet 74 and the magnetic sensor that is provided at the housing 54 of the buckle switch 52 changes. Due thereto, when the magnetic field of the magnet 74 at the position where the magnetic sensor is disposed changes, the electrical resistance of the magnetic sensor changes.

Due thereto, for example, when the change in the magnetic field of the magnet 74 is detected by the magnetic sensor when the magnet 74 of the slider 58 is slid by the ejector 30 at the time when the ejector 30 is moved to the position where the distal end portion of the engaging portion 42 of the latch 34 enters into the hole portion 28 of the body 18, the ECU of the vehicle in which the present buckle device 10 is installed judges that the tongue 16 is held at the buckle device 10 and that there is a state in which the webbing is applied to the body of the vehicle occupant.

Accordingly, for example, if, in the state in which the vehicle is traveling, the ejector 30 has not moved to the position where the distal end portion of the engaging portion 42 of the latch 34 enters into the hole portion 28 of the body 18, a warning device installed in the vehicle is operated by the ECU, and, for example, a warning lamp of the warning device flashes or a warning sound is issued from a warning buzzer.

By the way, when the tab 80 of the slider 58 is pushed toward the device rear side by the device front side surface of the inner side of the concave portion 82 of the ejector 30, the tab 80 starts to rotate in a direction (the arrow C1 direction in FIG. 7) around an axis whose axial direction is the device vertical direction, with the device right side end portion of the tab 80 being the center of rotation. Here, the lateral slits 62A and 62B are formed in the lateral portions 60A and 60B of the slider 58, and the tab 80 is disposed further toward the device upper side portion than the lateral slit 62A at the lateral portion 60A that is at the device left side. In contrast, the elastic portions 68A and 68B of the lateral portions 60A and 60B of the slider 58 are portions that are further toward the device lower side than the lateral slits 62A and 62B.

In this way, the tab 80 and the elastic portion 68A that is at the device left side are separated in the device vertical direction by the lateral slit 62A that is at the device left side. Therefore, at the time when the tab 80 is rotated due to the tab 80 being pushed toward the device rear side by the device front side surface of the inner side of the concave portion 82 of the ejector 30, deformation arising at the elastic portions 68A and 68B can be suppressed, and the elastic portion 68A at the device left side rotating toward the device left side and moving away from the elastic portion 68B at the device right side can be suppressed. Due thereto, the magnet 74 being moved toward the device front side with respect to the slider 58 can be suppressed by the stopper claws 70A and 70B of the both elastic portions 68A and 68B.

Further, in the present exemplary embodiment, the lateral slit 62A is provided between the elastic portion 68A of the slider 58 and the portion where the tab 80 is disposed at the lateral portion 60A of the slider 58. Therefore, the elastic portion 68A is disposed so as to be apart (separated), toward the device lower side, from the portion where the tab 80 is disposed at the lateral portion 60A, and the elastic portion 68A is provided near to the device lower side end at the slider 58. Due thereto, for example, if the elastic portion 68A is deformed toward the device left-right direction outer side of the slider 58 in a direction around an axis whose axial direction is the device front and rear direction with the device lower side end portion of the elastic portion 68A being the center of the deformation, the amount of displacement of the device upper side portion of the elastic portion 68A toward the device left-right direction outer side can be made to be small. Due thereto, deformation of the housing 54 of the buckle switch 52 that is due to such displacement of the elastic portion 68A can be suppressed, and inertial movement of the magnet 74 toward the device front side at the time when sliding of the slider 58 toward the device front side stops can be suppressed effectively, and the magnet 74 can be held effectively.

<Structure of Second Exemplary Embodiment>

Figure 6B:
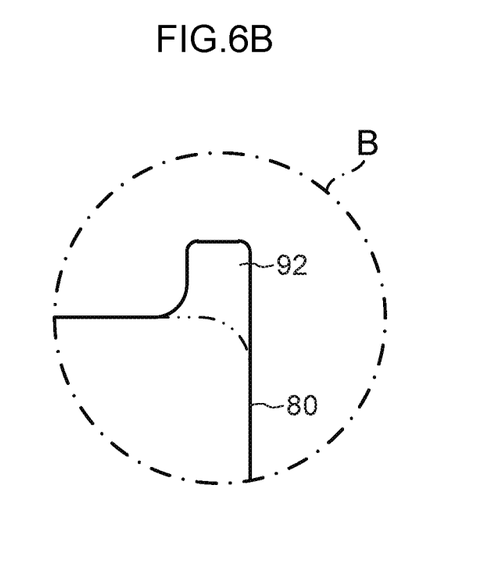
FIG. 6B is an enlarged front view of the slider of a buckle device relating to a second exemplary embodiment, and is a drawing corresponding to the one-dot chain line circle A portion of FIG. 6A.

A second exemplary embodiment is described next on the basis of FIG. 6B. The enlarged front view that is shown by the one dot chain line circle B in FIG. 6B is a drawing corresponding to the portion of the one dot chain line A in FIG. 6A in the first exemplary embodiment. As shown in FIG. 6B, in the present embodiment, a projecting portion 92 is provided at the distal end portion of the tab 80 of the slider 58 (the end portion of the tab 80 that is at the side opposite the lateral portion 60A that is at the device left side of the slider 58). The projecting portion 92 projects-out toward the device upper side from the distal end portion of the tab 80. The two dot chain line in circle B of FIG. 6B shows the corner portion at the device upper side of the distal end portion of the tab 80 of the slider 58 of the first exemplary embodiment. In the present embodiment that has the projecting portion 92, the surface area of the device front side of the tab 80 is larger than that of the tab 80 of the slider 58 of the first exemplary embodiment. Due thereto, the surface area over which the device front side surface of the tab 80 and the device front side surface of the inner side of the concave portion 82 of the ejector 30 face one another is larger, and the tab 80 can receive, over a large surface area, the load from the ejector 30 that is slid toward the device rear side.

Further, because the projecting portion 92 projects-out toward the device upper side from the distal end portion of the tab 80, at the time when the ejector 30 slides toward the device rear side, the portion, which is further toward the device front side than the concave portion 82, of the ejector 30 riding up onto the device upper side of the tab 80 can be suppressed effectively.

Note that, in the second exemplary embodiment, there is a structure in which the projecting portion 92 is formed to project-out toward the device upper side from the distal end portion of the tab 80. However, the projecting portion 92 may be provided at the intermediate portion of the tab 80 in the extension direction of the tab 80 from the slider 58, or the projecting portion 92 may project-out toward the device lower side from the tab 80. In such structures as well, the surface area over which the device front side surface of the tab 80 and the device front side surface of the inner side of the concave portion 82 of the ejector 30 face one another can be made to be large. In this way, the position at which the projecting portion 92 is disposed at the tab 80 is not particularly limited.

Further, the projecting portion 92 in the second exemplary embodiment may be provided at only the device front side portion of the tab 80. Further, the projecting portion 92 may be provided at only the device rear side portion of the tab 80. Moreover, the projecting portion 92 may be provided over the entire region in the device front and rear direction at the distal end portion of the tab 80. Namely, it suffices for the projecting portion 92 to be a structure in which at least one of the device front side surface and the device rear side surface of the projecting portion 92 can abut a device front and rear direction side surface of the inner side of the concave portion 82 of the ejector 30.

Moreover, in the above-described respective exemplary embodiments, a magnetoresistance effect element is applied to the magnetic sensor that serves as the proximity sensor of the proximity switch that is applied to the buckle switch 52. However, the magnetic sensor may be another magnetic sensor such as a Hall sensor or the like. Further, in the above-described respective exemplary embodiments, a proximity switch that uses a magnetic sensor as a proximity sensor is applied. However, the proximity switch may be an inductive proximity switch that detects the presence of metal, or a capacitive proximity switch that detects the presence of metal and a non-metal object, or the like, and the principles of detecting the moving body at the proximity switch are not particularly limited.

Further, in the above-described respective exemplary embodiments, there is a structure in which pushing force from the tongue 16 that is inserted into the buckle device 10 is applied to the tab 80 of the slider 58 indirectly via the ejector 30, and, due thereto, the slider 58 is slid. However, for example, there may be a structure in which the slider 58 is urged toward the device front side by the urging force of a slider urging portion such as a compression coil spring or the like, and the slider 58 is slid toward the device rear side due to the tab 80 of the slider 58 being pushed directly by the tongue 16.

Moreover, in the above-described respective exemplary embodiments, there is a structure in which the lateral slits 62A and 62B are formed in the both lateral portions 60A and 60B of the slider 58. However, there may be a structure in which the lateral slit 62A is provided only in the lateral portion 60A at the side at which the tab 80 is provided, and the lateral slit 62B is not provided in the lateral portion 60B that is at the side opposite the side at which the tab 80 is provided.

What is claimed is:

1. A buckle device comprising:
   a buckle main body configured such that a tongue provided at a webbing of a seatbelt device is inserted into an inner side of the buckle main body and is held at a predetermined position at the inner side of the buckle main body; and
   a moving body detecting unit that has a moving body that can move due to movement of the tongue inserted into the buckle main body, the moving body detecting unit detecting whether or not the tongue is inserted to the predetermined position in the buckle main body on the basis of a result of detection of the moving body;
   wherein the moving body detecting unit includes a holding unit which is movable with respect to the buckle main body, the holding unit including
      a holding portion at which the moving body is held, and
      a pressure receiving portion that is pushed directly or indirectly by the tongue inserted into the buckle main body,
   the holding portion and the pressure receiving portion being formed at the holding unit, and
   wherein the holding unit, the holding portion, and the pressure receiving portion move with respect to the buckle main body, together with the moving body which is held at the holding portion, due to the pressure receiving portion being pushed, and
   wherein the pressure receiving portion and the holding portion are separated such that deformation of the holding portion due to the pushing force applied directly or indirectly to the pressure receiving portion is suppressed.

2. The buckle device of claim 1, wherein a limiting portion is provided at the holding portion to face the moving body, the limiting portion limiting movement of the moving body toward an outer side of the holding portion.

3. The buckle device of claim 2, wherein a slit is provided between a pressure receiving portion disposed location at which the pressure receiving portion is disposed at the holding unit and a holding portion disposed location at which the holding portion is disposed at the holding unit.

4. The buckle device of claim 3, wherein the moving body detecting unit is provided with a housing at whose inner side the holding unit is disposed, and that has a portion facing the pressure receiving portion disposed location and the holding portion disposed location at the holding unit in a state in which the holding unit is disposed at the inner side of the housing.

5. The buckle device of claim 1, wherein a slit is provided between a pressure receiving portion disposed location at which the pressure receiving portion is disposed at the holding unit and a holding portion disposed location at which the holding portion is disposed at the holding unit.

6. The buckle device of claim 5, wherein the moving body detecting unit is provided with a housing at whose inner side the holding unit is disposed, and that has a portion facing the pressure receiving portion disposed location and the holding portion disposed location at the holding unit in a state in which the holding unit is disposed at the inner side of the housing.

7. The buckle device of claim 1, wherein the holding unit slide-moves with respect to the buckle main body due to the pressure receiving portion being pushed.

8. The buckle device of claim 1, wherein the holding portion and the pressure receiving portion formed as one piece with the holding unit, but are spaced apart from one another.

* * * * *